Oct. 17, 1961     O. E. DIETRICH     3,004,569
POWER OPERATED SCREWDRIVER
Filed Aug. 4, 1959     3 Sheets-Sheet 3
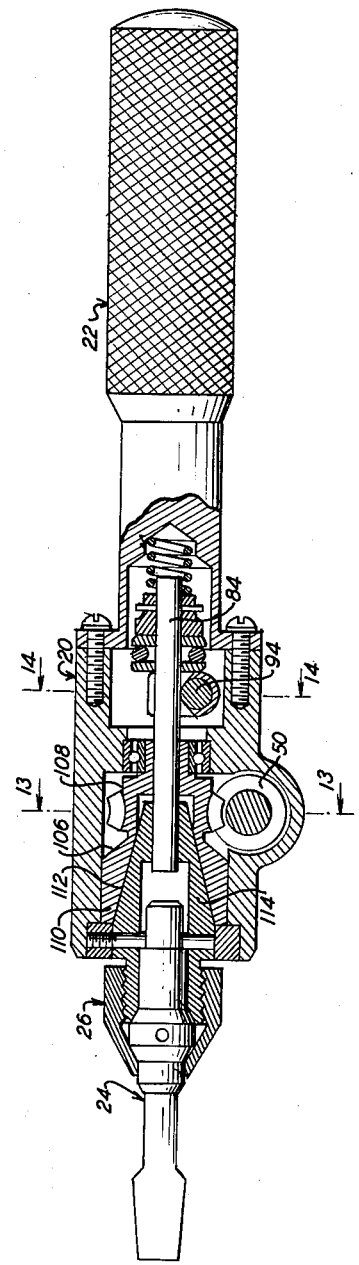
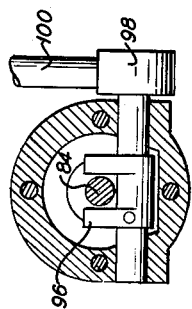
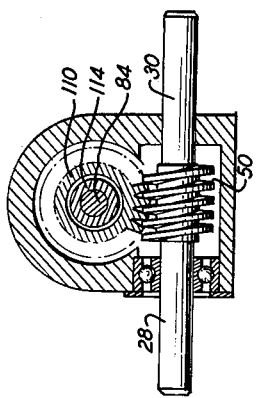
INVENTOR
OTTO E. DIETRICH.
BY
ATTORNEYS

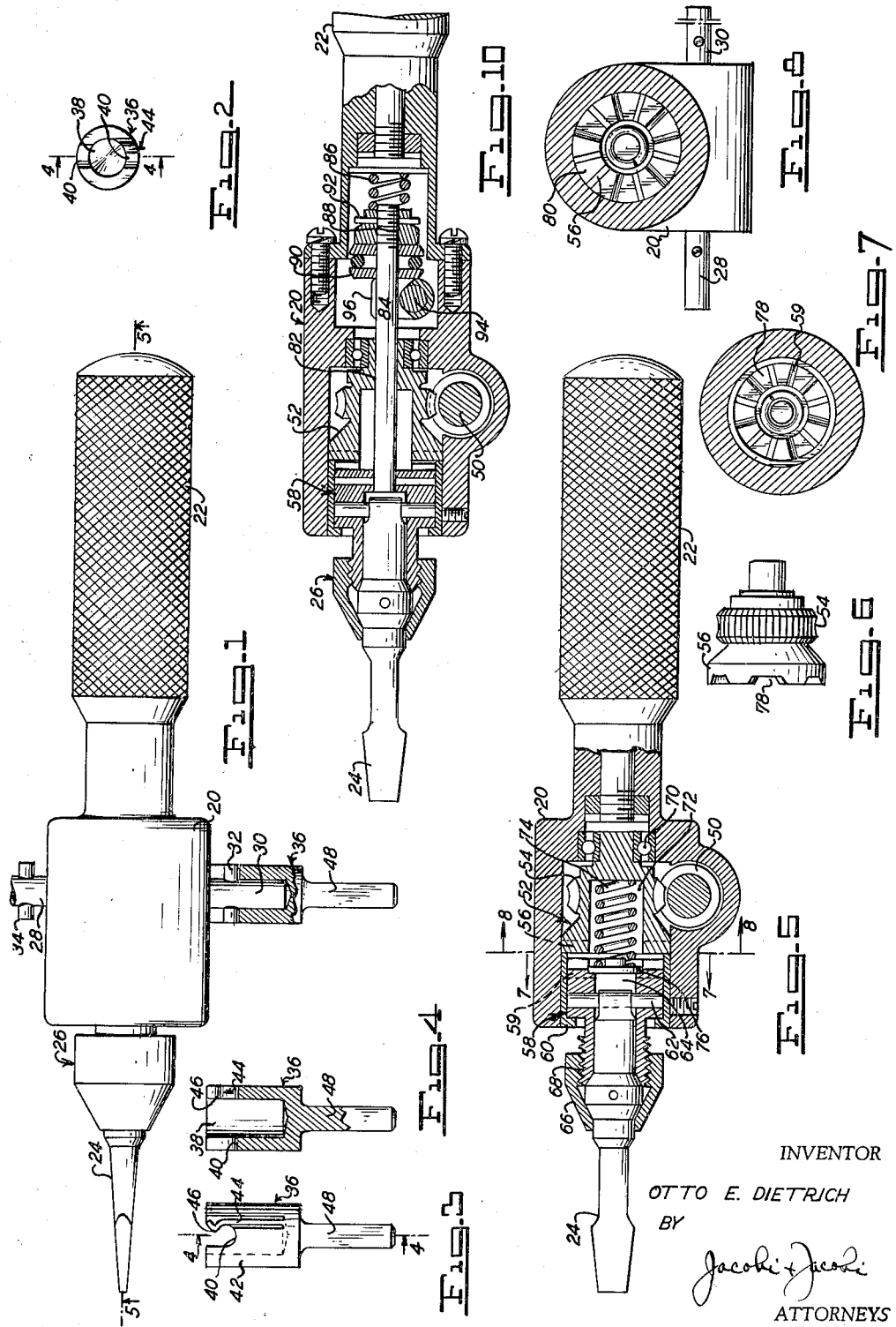
Oct. 17, 1961     O. E. DIETRICH     3,004,569
POWER OPERATED SCREWDRIVER
Filed Aug. 4, 1959     3 Sheets-Sheet 1
INVENTOR
OTTO E. DIETRICH
BY
Jacobi & Jacobi
ATTORNEYS

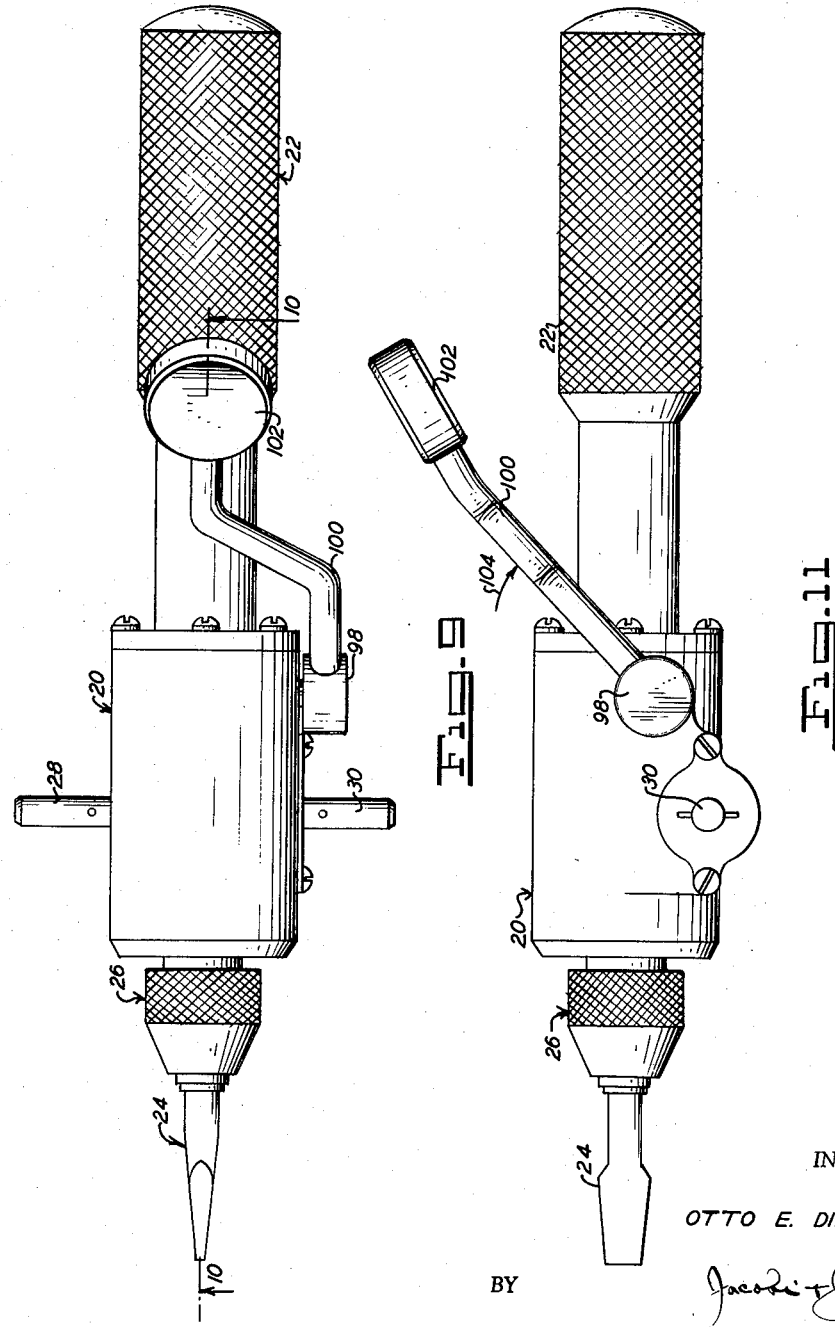

United States Patent Office 3,004,569
Patented Oct. 17, 1961

3,004,569
POWER OPERATED SCREWDRIVER
Otto E. Dietrich, 617 W. Jackson St., Morton, Ill.
Filed Aug. 4, 1959, Ser. No. 831,530
5 Claims. (Cl. 144—32)

This invention relates to tool attachments, and more particularly to tool attachments adapted for connecting rotatable tools to sources of rotary power.

It is an object of the invention to provide an improved tool attachment adapted for connecting a rotary tool to a source of rotary power, with the axis of rotation of the tool being angularly disposed with respect to the axis of rotation of the source of rotary power.

It is a further object of the invention to provide an improved tool attachment which enables a rotary tool to be easily and quickly connected to a source of rotary power and selectively operated substantially independently of the operation of said source.

A further object of the invention is to provide an improved tool attachment which facilitates rotating a tool in opposite rotary directions, this objective being especially important with respect to such tools as screw drivers and the like.

In achieving the above and other of its objectives, the invention contemplates the provision of a tool attachment in which is preferably employed a worm gear. The employment of a worm gear constitutes a feature of the invention, in that a reduction gear ratio conveniently results so that the source of rotary power, such as an electric drill, may be employed without there being the necessity of considering the speed of rotation thereof.

Operatively associated with the above-indicated worm gear, there is provided, in accordance with the invention, a clutch arrangement, part of which is driven by the worm gear and the second part of which constitutes or is connected with a chuck which accommodates the rotary tool.

As a feature of the invention, the engagement and disengagement of the clutch portions are controlled externally of the tool arrangement, so that with the source of rotary power connected to and rotating the worm gear, the rotation of the tool can be controlled independently of the source. In other words, in operation, the source may continually rotate the worm gear, but the adaptor and, therefore, the tool will be rotated only as desired and controlled through the intermediary of the clutch.

Advantageously, devices of the invention are very simple and inexpensive to manufacture, and can be readily adapted for use with different types of tools, as well as with different types of power sources.

Other objects, features and advantages of the invention will be found in the following detailed description of some preferred embodiments, as illustrated in the accompanying drawing, in which:

FIG. 1 is a top plan view of a tool attachment provided in accordance with one embodiment of the invention, the tool attachment being illustrated in operative association with a screw driver bit;

FIG. 2 is an end view of a component of said attachment by means of which the attachment can be coupled to a source of rotary power;

FIG. 3 illustrates a side view of the structure illustrated in FIG. 2;

FIG. 4 is a partially sectional view of the structure of FIGS. 2 and 3 taken along lines 4—4 therein;

FIG. 5 is an axial section of the tool attachment taken along line 5—5 in FIG. 1;

FIG. 6 illustrates a detail of the structure illustrated in FIG. 5;

FIGS. 7 and 8 are, respectively, sectional views taken along lines 7—7 and 8—8 of FIG. 5;

FIG. 9 is a top plan view of a tool attachment provided in accordance with a second embodiment of the invention;

FIG. 10 is an axial section of the apparatus of FIG. 9, taken along line 10—10;

FIG. 11 is a side view of the attachment illustrated in FIG. 9;

FIG. 12 is an axial section of a third embodiment of the invention;

FIG. 13 is a sectional view along line 13—13 of FIG. 12; and

FIG. 14 is a sectional view taken along line 14—14 of FIG. 12.

The tool attachment illustrated in FIG. 1 comprises a hollow attachment body 20, to which is connected a knurled handle 22. The body 20 and handle 22 extend symmetrically along a common longitudinal axis indicated in FIG. 1 as line 5—5.

Connected to the tool attachment is a screw driver bit 24 accommodated in a chuck 26 which is driven by apparatus within the hollow body 20, in a manner which will be hereinafter indicated in greater detail.

Arranged transversely of the longitudinal axis of the tool attachment are two extensions 28 and 30. As will be shown, these are the extensions from the opposite ends of a worm gear, these extensions being adapted for being driven by a rotary source of power in order to operate the bit 24.

Extensions 28 and 30 are preferably of square cross-section. In addition, they are preferably provided with transversely arranged pins 32 and 34. The round cross-sections and pins 32 and 34 adapt extensions 28 and 30 for use with an adaptor component 36.

Adaptor component 36 is illustrated in greater detail in FIGS. 2–4. In these figures it can be seen that component 36 is provided with a round receptacle 38 adapted to slidably accommodate one of the above-noted extensions and provided with a tranverse groove 40 for accommodating pins 32 and 34.

In FIGS. 3 and 4, it can be seen that recess 38 is provided in a thicker portion 42 of the adaptor component 36, wherein is also provided a tongue member 44 provided with an indent 46 which enables the adaptor component 36 to be properly positioned on one of the extensions.

In addition to the structure noted above, adaptor component 36 is also provided with a bit portion 48, which is insertable into the chuck of a rotary source of power, such as an electric drill.

Only one adaptor 36 need be provided, since the adaptor will be applied to only one of the extensions 28 and 30 at a given time. It will be appreciated that a source of rotary power generally has a fixed direction of rotation (i.e., clockwise or counterclockwise). This being the case, if the rotary source of power is coupled to extension 30 by means of adaptor component 36, the worm gear attached thereto will rotate in one rotary direction. Connection to the other extension will, however, rotate the worm gear in an opposite rotary direction and, therefore, as will be seen, the selective rotation of bit 24 in either one of the two rotary directions is a very simple matter.

The worm gear referred to above is identified by reference numeral 50 in FIG. 5. This worm gear is a conventional worm gear and provides inherently for a reduction gear ratio. Therefore, high speed electric drills may be used in association with the tool attachment of the invention without any fear that excessive speeds will cause undesirable results.

In FIG. 5, the extensions 28 and 30 extend in opposite axial directions relative to worm gear 50, and would occupy a position normal to the plane of the drawing. It will be appreciated that these extensions extend in opposite directions from the hollow body 20 so as to facilitate their selection and connection to a rotary power source.

Within the hollow body 20 and in operative engagement with the worm gear 50 is a drive member 52. This drive member comprises a toothed collar or gear 54 and a clutch portion 56. Toothed collar 54 and drive member 52 are rigidly affixed to one another or integral, and both are rotatable about a common axis of rotation coinciding with the longitudinal axis of the tool attachment.

Spaced axially of the drive 52 is a rotatable and axially slidable chuck or chuck bearing member 58. Chuck 58 is supported in bushing 60 for rotation about the longitudinal axis of the tool attachment. Chuck 58 comprises a clutch portion 59 which is intended to be engaged selectively with clutch portion 56 of drive member 52. A transverse pin 62 is provided in the chuck, which is also provided with a central bore 64 accommodating bit 24. A collar 66 is provided with a thread 68 for threadably engaging the chuck 58, so that bit 24 may be secured in the chuck and so that such bits are interchangeable.

Drive member 52 is supported for rotation within the hollow body 20 by a ball bearing 70. Ball bearing 70, in cooperation with bushing 60, prevents drive member 52 from being displaced axially along the longitudinal axis of the attachment.

As noted above, chuck 58 is free to rotate about the longitudinal axis of the attachment and is, in addition, displaceable along said axis. Drive device 52 is provided with a central bore 72 in which is accommodated a resilient device 74 which may, for example, be a helical spring. This resilient device operates through the intermediary of a disc 76 and forces chuck 58 to a position whereat it is spaced in entirety from the drive member 52. Drive member 52 may be seen in greater detail in FIG. 6, which pictorially illustrates the toothed collar 54, as well as clutch portion 56. FIG. 6, as well as FIGS. 7 and 8, illustrate that portions 56 and 59 of drive member 52 and chuck 58 respectively constitute portions of a dog clutch having sections 78 and 80 of mating and interengageable configurations for the transferral of rotary power in conventional manner. FIG. 8 particularly illustrates how extensions 28 and 30 extend transversely of hollow body 20 so as to facilitate connection selectively to a source of rotary power.

For operation, a bit 24 of predetermined size is inserted into the bore 64 of chuck 58 to a position whereat it abuts and engages transverse pin 62. Collar 66 is then engaged threadably with the chuck, to maintain bit 24 in position.

At the same time, the adaptor component 36 is attached to one of the extensions 28 or 30, depending on which direction of rotation is desired for the worm gear 50 and, therefore, for the bit 24.

At this time, resilient device 74 urges chuck 58 away from the drive member 52, so that there is a space between the same. Thus, when the rotary source of power is rendered active and the worm gear 50 rotated, the drive member 52 is rotated idly. An axial pressure exerted against handle 22, however, with the operative portion of bit 24 engaged with the head of a screw, will overcome the force of resilient device 74, and chuck 58 will be displaced axially against clutch portion 56 of drive member 52. The rotation of drive member 52 will thus be imparted to chuck 58, and bit 24 will be rotated.

It is to be noted, however, that with the rotary source of power fully operative, pressure on the handle 22 may be released. Resilient device 74 will then be effective to urge chuck 58 away from drive member 52, whereupon rotation of bit 24 will be terminated. This operation is completely independent of the operation of the source of rotary power once the latter has been actuated and, for example, makes it possible to change bits without requiring the shutting off of the rotary power source.

A second embodiment of the invention is illustrated in FIGS. 9–11, wherein the structure is similar to that of the first embodiment, at least to the extent that it comprises a hollow attachment body 20 and a handle 22 with a bit 24 accommodated by a chuck 26. This second embodiment of the invention also further comprises extensions 28 and 30, by means of which a worm gear 50 is rotated to drive or rotate the drive member 52. As with the first embodiment, worm gear 50 and drive member 52 have a specific relationship to the longitudinal axis of the tool attachment. First of all, the worm gear is arranged so that its axis of rotation is perpendicular to the longitudinal axis of the tool attachment and is spaced from this longitudinal axis. Furthermore, the worm gear and drive member are fixed against displacement along said longitudinal axis.

As in the first embodiment, drive member 52 is free to rotate under the control of worm gear 50 on the longitudinal axis of the structure, along with chuck portion 58. Furthermore, the chuck and drive member each comprises respective portions of a dog clutch, as described hereinabove.

The principal difference between the first embodiment and the second embodiment of the invention consists of the provision of a different type of clutch control mechanism. To this end, drive member 52 is provided with an axial passage 82, through which extends an axially aligned rod 84. Axially aligned rod 84 is engaged at one end by a resilient device or spring 86 which tends to urge rod 84 against chuck portion 58, so as to separate the latter from the drive member 52 and to prevent the engagement of the associated clutch portions. Thus, under normal circumstances, rod 84 disengages bit 24 from worm gear 50.

The end 88 of rod 84 is threaded, and on this end is positioned a collar arrangement 90, prevented from slipping off of end 88 by means of a nut arrangement 92. A pin or shaft 94 is arranged with its axis parallel to that of the worm gear 50, the axis of shaft 94 being spaced from rod 84. The shaft 94 has mounted thereupon at least one and preferably two lugs 96, which sandwich the rod 84 and are free to move axially therealong. Externally of the hollow body 20 is a collar 98 which, by means of a set screw (not shown) engages an extremity of shaft 94. To collar 98 is connected a lever 100 and a key 102.

The rod 84 is independent of the drive member 52 in the sense that it does not rotate with the latter. Rod 84 may be connected with chuck portion 58 so that it either rotates with the same or such that chuck portion 58 rotates independently of rod 84. In any event, it is essential only that axial displacement of rod 84 be imparted to chuck portions 58 so as to engage the respective portions of the dog clutch (as, for example, illustrated in FIGS. 7 and 8). A clockwise movement of lever 100, as illustrated by arrow 104 in FIG. 11, rotates shaft 94 in a clockwise direction, so that lugs 96 bear against collar arrangement 90 and thus move rod 84 axially to the right in FIG. 10. Rod 84 carries along with it chuck portion 58, whereupon the clutch portions associated with drive member 52 and chuck portion 58 are brought to relative positions whereat they mesh. This has the effect of operatively coupling bit 24 with worm gear 50, whereupon said bit is rotated.

Upon a releasing of lever 100 by removal of the pressure exerted on key 102 to effect the aforegoing operation, spring 86 urges rod 84 axially to the left in FIG. 10, so that chuck portion 58 and drive member 52 are separated and the drive interrupted. It will be appreciated that, if desired, the force of spring 86 can be overcome by pressure exerted axially through handle 22.

Aside from the method of controlling clutch engagement and disengagement, the second embodiment is essentially the same as the first embodiment, and all of the advantages of the first embodiment inure as well to the second embodiment. Thus, for example, it is possible to rotate the bit 24 independently of the control of the rotary power source associated therewith, to the extent that, when the rotary power source is operating, it is possible to independently interrupt the operation or control the operation of bit 24.

A third embodiment of the invention is illustrated in FIGS. 12–14, wherein the structure again comprises a hollow body 20, a handle 22 with a bit 24 being accommodated in a chuck 26 which is rotated by means of a worm gear 50 connected to a source of rotary power.

As in the preceding embodiment, there is provided a rod 84 controlled through the intermediary of a shaft 94 for purposes of engaging and disengaging a clutch arrangement. FIG. 14 particularly illustrates the form which may be given to lugs 96, and further illustrates the manner in which rod 84 is sandwiched.

In this embodiment of the invention, the distinction with respect to the preceding embodiment resides in the provision of a different type of clutch arrangement.

Engaging the worm gear 50, in this instance, is a drive member 106. Drive member 106 includes a toothed wheel or collar 108 in engagement with worm gear 50, and further includes a clutch portion 110 rotatable with collar 108 and defining an internal recess 112 of conical configuration. The chuck 26, in this instance, comprises a conical extremity 114 which is controllably insertable in said conical recess.

Under the control of rod 84, conical extremity 114 is brought to bear against clutch portion 110 in the conical recess 112 thereof. Worm gear 50 is, therefore, selectively coupled to bit 24, as desired, by means of lever 100.

This embodiment of the invention, in addition to incorporating the various features of the previously described embodiments, has the additional advantage that slippage is provided for. For example, should the bit 24 be subjected to a large unyielding load, it is possible for conical extension 114 to slip in recess 112, therefore avoiding the possibility of an accompanying shock. This advantage is, to a certain extent, also present in the dog type of clutch, but is considered more efficient in the instant type of friction drive.

In general, it is to be noted that in tool attachments of the invention rotary power is supplied to the attachment at an angle to the axis of rotation of the output power transmitted, for example, through bit 24. By this arrangement, the invention facilitates the employment of rotary power under conditions wherein rotary sources of power could not normally be employed.

There will now be obvious to those skilled in the art many modifications and variations of the structure set forth, which modifications and variations, however, will not depart from the scope of the invention, as defined in the following claims.

What is claimed is:
1. A tool attachment comprising a hollow adaptor body having a longitudinal axis, a toothed drive means fixed against movement along said longitudinal axis but mounted for rotation on said axis within said body, a worm gear arranged transversely of said axis and in engagement with said toothed drive means for rotating the latter, a rod within said body extending through said toothed drive means and rotatable on said longitudinal axis independently of said drive means, a chuck adapted for supporting a rotary tool, said chuck being rotatable in said body and displaceable along said longitudinal axis, said rod being connected to said chuck for displacing the latter axially against said drive means whereby the chuck is driven by said drive means, resilient means engaging said rod and normally displacing the same axially such that said chuck is maintained out of engagement with said drive means, a lever on said body and operatively coupled with said rod to displace the same against the action of said resilient means whereby said chuck is moved into engagement with said drive means, said lever extending externally of said body for being manually engaged.

2. An attachment as claimed in claim 1 wherein said chuck and drive means each comprise portions constituting respectively sections of a dog clutch for transferring rotary power from said drive means to said attachment.

3. A tool attachment comprising a hollow adaptor body having a longitudinal axis, a worm gear arranged transversely of said axis and spaced therefrom, said worm gear being rotatable in said body but fixed against movement along said longitudinal axis, a toothed collar within said body and in engagement with said worm gear, said toothed collar being rotatable on said axis but being fixed against axial movement therealong, a clutch section fixed to said toothed collar and concentric therewith, said clutch section defining a conical recess having an axis corresponding to said longitudinal axis, a second clutch section having an axis corresponding to said longitudinal axis and having a conical configuration adapted for engaging in the conical cavity of the first said clutch section, the second clutch section being axially displaceable along said longitudinal axis, a chuck rigidly connected with the second clutch section for being rotated therewith, said chuck being adapted for accommodating a rotary tool, resilient means operatively associated with the second clutch section for urging the same out of engagement with the first said clutch section, and a lever operatively associated with said resilient means for overcoming action of the latter on said second clutch section whereby the clutch sections are brought into engagement and said chuck driven by said worm gear.

4. An attachment as claimed in claim 3 wherein said worm gear includes extensions extending in opposite directions from said body, said attachment further comprising adapting means for coupling said extensions selectively to a source of rotary power.

5. An attachment as defined in claim 2, wherein said worm gear includes extensions extending in opposite directions from said body, said attachment further comprising adapting means for coupling said extensions selectively to a source of rotary power.

References Cited in the file of this patent
UNITED STATES PATENTS

| | | |
|---|---|---|
| 1,024,151 | Smith | Apr. 23, 1912 |
| 1,305,680 | Young | June 3, 1919 |
| 2,429,569 | Stewart | Oct. 21, 1947 |
| 2,790,471 | Graybill | Apr. 30, 1957 |

FOREIGN PATENTS

| | | |
|---|---|---|
| 711,414 | France | June 30, 1931 |
| 485,885 | Germany | Nov. 11, 1929 |
| 625,352 | France | Apr. 23, 1927 |